G. W. COOK.
Devices to Prevent Retrograde Motion of Balance Wheels on Sewing-Machines.

No. 136,972. Patented March 18, 1873.

Witnesses
Harvey T. Weeks
William H. Cook

Inventor
George W. Cook

UNITED STATES PATENT OFFICE.

GEORGE W. COOK, OF CHICAGO, ILLINOIS, ASSIGNOR OF ONE-HALF HIS RIGHT TO HARVEY T. WEEKS, OF SAME PLACE.

IMPROVEMENT IN DEVICES TO PREVENT RETROGRADE MOTION OF BALANCE-WHEELS ON SEWING-MACHINES.

Specification forming part of Letters Patent No. 136,972, dated March 18, 1873.

*To all whom it may concern:*

Be it known that I, GEO. W. COOK, of Chicago, Cook county, Illinois, have invented an Improvement in Sewing-Machines, of which the following is a specification:

The nature and object of this invention consists in a device by means of which, with a slight lateral movement of a person's leg, while operating a sewing-machine, the machine is set in motion in the proper direction, whether having stopped on its center or not, thereby giving the operator the use of both hands with which to guide and handle the work.

Figure 1:
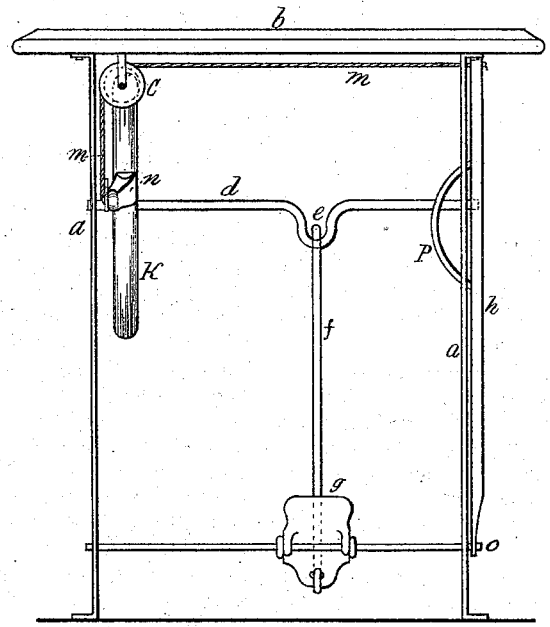
Figure 2:
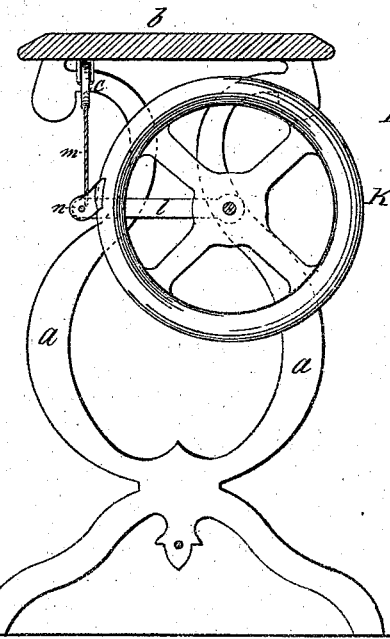
Figure 3:
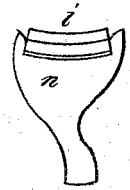

Figure 1 is a front view of a sewing-machine frame to which my invention is attached. Fig. 2 is an end view of the same. Fig. 3 is a bottom view of the dog *n*, which forms a part of my attachment, showing the rubber attachment to the dog.

*a* is the frame of a sewing-machine, made in any of the known forms. *b* is the top upon which the working movements of the machine (not herein shown) are placed. *g* is the treadle; *f*, the pitman-rod; *e* and *d*, the crank and shaft; *k*, the balance-wheel; these forming the parts from which motion is communicated to the working parts upon the top *b* by means of a belt around the balance-wheel or around a driving-pulley at the side of the balance-wheel. The arm *l*, dog *n*, cord *m*, pulley *c*, and lever *h* are the parts forming my attachment. The arm *l* is placed between the frame of the machine and the balance-wheel, one end of the arm having a bearing either around the shaft or screw which passes through the balance-wheel, or around the flange of the wheel, as the case may require, in the different-constructed machines, as shown in Fig. 2. The arm is of sufficient length to extend beyond the balance-wheel some two or three inches. At the outer end of the arm the dog *n* is so hinged that by its own weight it is kept in an inclining position against the balance-wheel, that part of the dog touching the wheel being faced with rubber to create a friction, and thereby make the dog wedge readily between the wheel and the point on which the dog is hinged when the arm *l* is raised upward or the balance-wheel is turned the wrong direction, thus making the device fill two offices, namely, starting the machine, and also prevent it from running backward. The dog *n* is made with a quarter circle corresponding with the round of the balance-wheel, there being a dovetail-shaped flange at each end of this circle, which holds the rubber facing *i* to its place and shape, as shown in Fig. 3. I place the pulley *c* under the top of the machine, on a line with the arm *l* and rim of the balance-wheel. Over this pulley I place the cord *m*, one end of which is attached to the arm *l* near the outer end, which holds the arm to its position, the other end of the cord being attached to the lever *h* on the opposite side of the machine, as shown in Fig. 1.

In the accompanying drawing, the lever *h* is represented as hinged to the end of the girth on the outside of the frame of a machine, as shown at *o* in Fig. 1. This makes it necessary to form a curve or projection from a straight lever, which will project some two or three inches inside of the frame *a*, as shown at *p* in Fig. 1, this being the point operated on by a lateral motion of the operator's leg when starting the machine.

In cabinet-case machines a straight lever hinged near the bottom of the case is all that is necessary.

What I claim as new, and desire to secure by Letters Patent, is—

The pulley *c*, cord *m*, and lever *h*, in combination with the arm *l* and dog *n*, substantially as and for the purposes hereinbefore set forth.

GEORGE W. COOK.

Witnesses:
HARVEY T. WEEKS,
WILLIAM H. COOK.